US012737126B1

(12) United States Patent
Sabbag et al.

(10) Patent No.: US 12,737,126 B1
(45) Date of Patent: Sep. 15, 2026

(54) MEMORY SUB-CHANNEL RELIABILITY

(71) Applicant: Amazon Technologies, Inc., Seattle, WA (US)

(72) Inventors: Erez Sabbag, Koranit (IL); Itai Avron, Petah Tikva (IL); Anat Arbely, Kiryat Tivon (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/902,239

(22) Filed: Sep. 30, 2024

(51) Int. Cl.
*G06F 3/06* (2006.01)
*G06F 11/10* (2006.01)

(52) U.S. Cl.
CPC .......... *G06F 3/0619* (2013.01); *G06F 3/0659* (2013.01); *G06F 3/0673* (2013.01); *G06F 11/1044* (2013.01)

(58) Field of Classification Search
CPC ............... G06F 3/0619; G06F 11/1044; G06F 3/0673; G06F 3/0659
See application file for complete search history.

(56) References Cited

U.S. PATENT DOCUMENTS 5,463,643 A 10/1995 Gaskins et al.
8,788,876 B2 7/2014 Jeddeloh
9,766,837 B2 9/2017 McGlaughlin et al.
10,546,628 B2 * 1/2020 Kim ...................... G11C 29/76
10,691,626 B2 6/2020 Nale et al.
11,990,199 B2 5/2024 Song et al.
12,019,516 B2 6/2024 Yang et al.
12,112,049 B2 * 10/2024 Fitzpatrick .......... G11C 11/4096
12,235,720 B2 2/2025 Agarwal et al.
2007/0013704 A1 * 1/2007 MacWilliams ..... G06F 13/1684 345/542
2007/0133322 A1 6/2007 Proell et al.
2008/0320255 A1 12/2008 Wingard et al.
2009/0327596 A1 * 12/2009 Christenson ........ G06F 13/1684 711/E12.001
2017/0060436 A1 3/2017 Trika et al.
2017/0091023 A1 3/2017 Gilda et al.
2018/0157441 A1 * 6/2018 Bains .................. G06F 13/1678
2020/0133769 A1 * 4/2020 Bains .................. G06F 13/1668
2021/0141692 A1 * 5/2021 Agarwal ............ G06F 11/1048

(Continued)

FOREIGN PATENT DOCUMENTS

TW I602190 B 10/2017

OTHER PUBLICATIONS

U.S. Appl. No. 18/902,212, inventors Sabbag E et al., filed Sep. 30, 2024.

(Continued)

*Primary Examiner* — Mark A Giardino, Jr.
(74) *Attorney, Agent, or Firm* — Weaver Austin Villeneuve & Sampson LLP

(57) ABSTRACT

Techniques to improve the reliability of volatile memory may include receiving a write request to store a data chunk in a volatile memory implemented using a memory module that contains a plurality of memory sub-channels. In response to the write request, a first write access is performed to write at least a first portion of the data chunk into a first memory sub-channel of the memory module, and a second write access is performed to write at least a second portion of the data chunk into a second memory sub-channel of the memory module.

19 Claims, 10 Drawing Sheets

(56) References Cited

U.S. PATENT DOCUMENTS

| | | | | |
|---|---|---|---|---|
| 2021/0248094 | A1* | 8/2021 | Norman | G06F 9/4403 |
| 2023/0008412 | A1* | 1/2023 | Brown | G06F 11/1076 |
| 2023/0176749 | A1* | 6/2023 | Hily | G06F 11/1048<br>711/154 |
| 2023/0386598 | A1 | 11/2023 | Yoo et al. | |

OTHER PUBLICATIONS

WIKIPEDIA: The Free Encyclopedia, "Hamming(7,4)," Jun. 4, 2023, pp. 1-11, URL: https://w.wiki/Fyxs.

U.S. Non-Final Office Action dated Feb. 3, 2026 in U.S. Appl. No. 18/902,212.

U.S. Final Office Action dated Jun. 16, 2026 in U.S. Appl. No. 18/902,212.

* cited by examiner

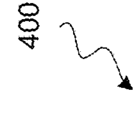

Memory Sub-Channel 440

| Burst | Device-0 | Device-1 | Device-2 | Device-3 | Device-4 |
| --- | --- | --- | --- | --- | --- |
| 0 | data[0:7] | data[8:15] | data[16:23] | data[24:31] | ecc[0:7] |
| 1 | data[32:39] | data[40:47] | data[48:55] | data[56:63] | ecc[8:15] |
| 2 | data[64:71] | data[72:79] | data[80:87] | data[88:95] | ecc[16:23] |
| 3 | data[96:103] | data[104:111] | data[112:119] | data[120:127] | ecc[24:31] |
| 4 | data[128:135] | data[136:143] | data[144:151] | data[152:159] | ecc[32:39] |
| 5 | data[160:167] | data[168:175] | data[176:183] | data[184:191] | ecc[40:47] |
| 6 | data[192:199] | data[200:207] | data[208:215] | data[216:223] | ecc[48:55] |
| 7 | data[224:231] | data[232:239] | data[240:247] | data[248:255] | ecc[56:63] |
| 8 | data[256:263] | data[264:271] | data[272:279] | data[280:287] | ecc[64:71] |
| 9 | data[288:295] | data[296:303] | data[304:311] | data[312:319] | ecc[72:79] |
| 10 | data[320:327] | data[328:335] | data[336:343] | data[344:351] | ecc[80:87] |
| 11 | data[352:359] | data[360:367] | data[368:375] | data[376:383] | ecc[88:95] |
| 12 | data[384:391] | data[392:399] | data[400:407] | data[408:415] | ecc[96:103] |
| 13 | data[416:423] | data[424:431] | data[432:439] | data[440:447] | ecc[104:111] |
| 14 | data[448:455] | data[456:463] | data[464:471] | data[472:479] | ecc[112:119] |
| 15 | data[480:487] | data[488:495] | data[496:503] | data[504:511] | ecc[120:127] |

Cache Line 482

ECC Info 484

Memory Sub-Channel A 540a

| Burst | Device-0 | Device-1 | Device-2 | Device-3 | Device-4 |
|---|---|---|---|---|---|
| 0 | data[0:7] | data[8:15] | data[16:23] | data[24:31] | ecc[0:7] |
| 1 | data[32:39] | data[40:47] | data[48:55] | data[56:63] | ecc[8:15] |
| 2 | data[64:71] | data[72:79] | data[80:87] | data[88:95] | ecc[16:23] |
| 3 | data[96:103] | data[104:111] | data[112:119] | data[120:127] | ecc[24:31] |
| 4 | data[128:135] | data[136:143] | data[144:151] | data[152:159] | ecc[32:39] |
| 5 | data[160:167] | data[168:175] | data[176:183] | data[184:191] | ecc[40:47] |
| 6 | data[192:199] | data[200:207] | data[208:215] | data[216:223] | ecc[48:55] |
| 7 | data[224:231] | data[232:239] | data[240:247] | data[248:255] | ecc[56:63] |

Memory Sub-Channel B 540b

| Burst | Device-5 | Device-6 | Device-7 | Device-8 | Device-9 |
|---|---|---|---|---|---|
| 0 | data[256:263] | data[264:271] | data[272:279] | data[280:287] | ecc[64:71] |
| 1 | data[288:295] | data[296:303] | data[304:311] | data[312:319] | ecc[72:79] |
| 2 | data[320:327] | data[328:335] | data[336:343] | data[344:351] | ecc[80:87] |
| 3 | data[352:359] | data[360:367] | data[368:375] | data[376:383] | ecc[88:95] |
| 4 | data[384:391] | data[392:399] | data[400:407] | data[408:415] | ecc[96:103] |
| 5 | data[416:423] | data[424:431] | data[432:439] | data[440:447] | ecc[104:111] |
| 6 | data[448:455] | data[456:463] | data[464:471] | data[472:479] | ecc[112:119] |
| 7 | data[480:487] | data[488:495] | data[496:503] | data[504:511] | ecc[120:127] |

FIG. 5

| Addr | Memory Channel 610 | |
|---|---|---|
| | Sub-Channel A 640a | Sub-Channel B 640b |
| 0 | a0 | a0 |
| 1 | a1 | a1 |
| 2 | a2 | a2 |
| 3 | a3 | a3 |
| 4 | a4 | a4 |
...
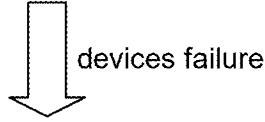
| Addr | Memory Channel 610 | | |
|---|---|---|---|
| | Sub-Channel A 640a | | Sub-Channel B 640b |
| 0 | | eECC(a0) | a0 |
| 1 | | eECC(a1) | a1 |
| 2 | | eECC(a2) | a2 |
| 3 | | eECC(a3) | a3 |
| 4 | | eECC(a4) | a4 |
...
FIG. 6

| Addr | Ch. 0 710 | Ch. 1 711 | Ch. 2 712 | Ch. 3 713 |
|---|---|---|---|---|
| 0 | a0 | b0 | c0 | XOR(a0,b0,c0) |
| 1 | XOR(a1,b1,c1) | a1 | b1 | c1 |
| 2 | a2 | XOR(a2,b2,c2) | b2 | c2 |
| 3 | a3 | b3 | XOR(a3,b3,c3) | c3 |
| 4 | a4 | b4 | c4 | XOR(a4,b4,c4) |
...
| Addr | Ch. 0 710 | Ch. 1 711 | Ch. 2 712 | Ch. 3 713 |
|---|---|---|---|---|
| 0 | | b0 | c0 | a0 |
| 1 | | a1 | b1 | c1 |
| 2 | | a2 | b2 | c2 |
| 3 | | b3 | a3 | c3 |
| 4 | | b4 | c4 | a4 |
...
FIG. 7

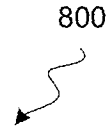
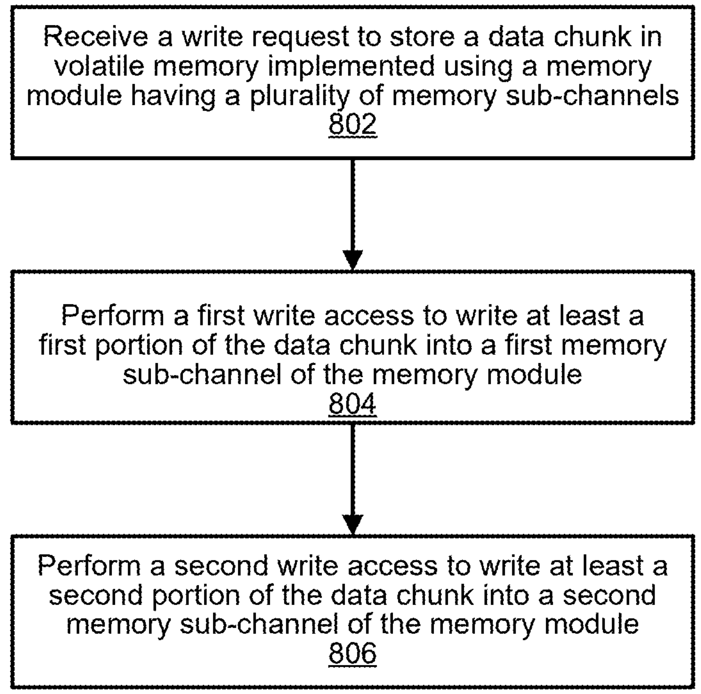
FIG. 8

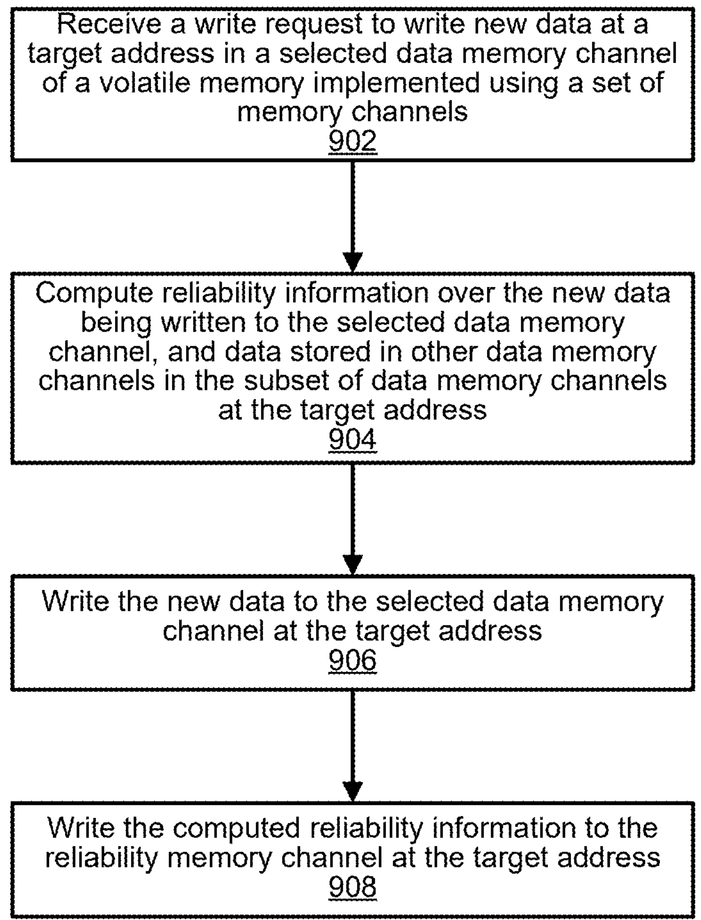
FIG. 9

MEMORY SUB-CHANNEL RELIABILITY

BACKGROUND

Memory errors can occur when one or more bits of a block of data stored in memory are flipped from 0 to 1, or vice versa. For instance, soft errors may occur when charged particles from radiation rays interact with a memory device, or hard errors may occur due to a defect or a faulty memory device. Depending on what the data stored in memory is used for, memory errors can be tolerated to a certain extent or may necessitate replacement of the memory, e.g., swapping in a new memory module. Error correction codes (ECCs) can be implemented to allow recovery of the original data when error occurs. ECCs can be used to identify a certain number of error locations, and hence allow the erroneous bits to be corrected. However, the error correction capability of ECC can be limited, and is dependent on the specific coding scheme employed.

BRIEF DESCRIPTION OF THE DRAWINGS

Various embodiments in accordance with the present disclosure will be described with reference to the drawings, in which:

FIG. 4 illustrates an example of a data structure for storing a data chunk in memory;

FIG. 5 illustrates an example of a data structure for storage a data chunk using sub-channel interleaving;

FIG. 6 illustrates an example of sub-channel mirroring;

FIG. 7 illustrates an example of cross-channel parity protection;

FIG. 8 illustrates a flow diagram of an example of performing a memory access;

FIG. 9 illustrates a flow diagram of another example of performing a memory access.

DETAILED DESCRIPTION

To support compute intensive applications such as high-performance computing, artificial intelligence and machine learning, high-resolution video processing and gaming, etc., new generations of volatile memory are being developed to meet the processing needs of computing systems running such applications. Newer volatile memories are typically manufactured at smaller technology nodes to improve density, operate at higher clock frequencies to increase memory bandwidth, and run at lower voltages to reduce power consumption. Any of these factors individually can cause error rates to increase. Collectively, these factors can have a detrimental impact on the longevity and reliability of the memory.

One way to improve the reliability of volatile memory is to employ ECC protection schemes. For example, a memory device may provide on-die ECC to correct bit errors within the memory die before outputting data from the memory. ECC can also be employed at the memory module level to protect against bit errors during transit of the data between components of the system. However, even with on-die and on-module ECC, higher reliability may be needed with shrinking chip dimensions, higher clock frequencies, and lower supply voltages. This is especially true for server-class computing systems that are supposed to provide a high level of data integrity.

The techniques disclosed herein can be used to improve the reliability of volatile memory such as dynamic random-access memory (DRAM). In some implementations, interleaving the data across memory sub-channels can improve chipkill protection. Additional redundancy can also be deployed at the sub-channel level by performing sub-channel mirroring to mirror data from one memory sub-channel to the other memory sub-channel on a memory module. At the channel level, cross-channel parity protection can be used to implement additional redundancy by allocating a memory channel for storing reliability information (parity values) computed over the other memory channels. Such techniques can be deployed individually or in any combination, and can be used on top of the on-die ECC and on-module ECC protections to provide a multilevel protection scheme against memory errors.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
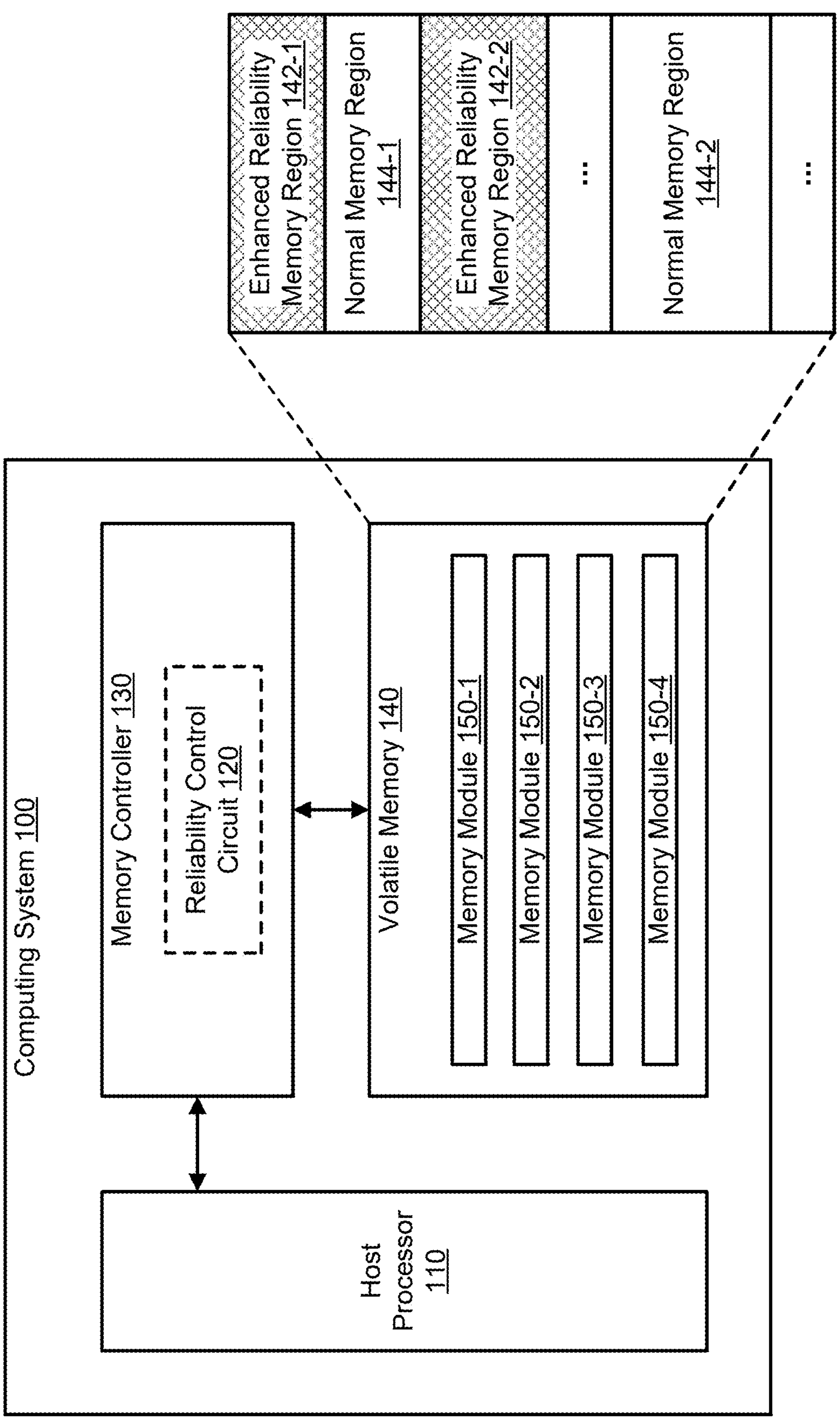
FIG. 1 illustrates a simplified block diagram of an example of a computing system.

FIG. 1 illustrates a simplified block diagram of an example of a computing system 100 that can implement the techniques disclosed herein. Computing system 100 includes a host processor 110, a memory controller 130, and volatile memory 140. In some implementations, the computing system may include more or fewer components, combine or separate one or more components, or have a different arrangement of components. Computing system 100 can be a server, a desktop computer, a laptop, or the like.

Host processor 110 may include one or more processing units such as general-purpose processors (e.g., a central processing unit (CPU), etc.), special-purpose processors (e.g., a digital signal processor (DSP), graphics processing unit (GPU), tensor processing unit (TPU), etc.), or the like. Host processor 110 can include a combination of different types of processors, for example, a CPU in combination with a GPU or a DSP. Host processor 110 can be configured to execute instructions to run various software components such as an operating system and various applications. In some implementations, host processor 110 may execute a hypervisor and provide support for virtualization and instances of virtual machines.

Volatile memory 140 may include dynamic random-access memory such as DRAM. Volatile memory 140 can be implemented using user-replaceable and/or modular components such as memory modules containing memory chips. For example, volatile memory 140 can include one or more memory modules such as dual in-line memory modules (DIMMs) or single in-line memory modules (SIMMs). In the example shown, volatile memory 140 includes four memory modules 150-1 to 150-4. Each memory module can include multiple memory devices. For instance, DRAM modules often include four, eight, ten, or an even greater number of DRAM chips/dies. Depending on the configuration of computing system 100, each memory module may form a memory channel that can be independently accessed by host processor 110 and/or memory controller 130. In some implementations, multiple memory modules can be combined to form a memory channel. More generally, a memory channel refers to a group of one or more memory modules that can be accessed by the computing system independently from other memory channel(s).

Volatile memory 140 can be assigned an address space, for example, by host processor 110. The address space can be allocated among the various memory devices that form volatile memory 140. For instance, a first memory module could be assigned an upper address range and a second memory module assigned a lower address range, with the upper address range and the lower address range being distributed across the memory devices that form the first memory module and the second memory module, respectively. Data accessed as part of executing instructions by host processor 110 can be stored in a distributed fashion across the memory devices such that, for a given instruction, multiple memory locations may be read from and/or written to, with the multiple memory locations being locations in the same memory device or different memory devices.

In some implementations, the address range allocated to volatile memory 140 can be separated into different memory regions. For example, the address range can be separated into normal memory regions (e.g., memory regions 144-1, 144-2, etc.) and enhanced reliability memory regions (e.g., memory regions 142-1, 142-2, etc.). The normal memory regions can be used to store data that may not require increased level of reliability, whereas the enhanced reliability memory regions can be used to store data that may require a heightened level of reliability. For instance, user network packet data can be stored in the normal memory regions, because retransmission of the network packet from the source can be requested in case of data corruption. In contrast, corruption in operating system metadata can cause the computing system to hang, and thus such data can be stored in the enhanced reliability memory regions. It should be noted that the memory regions need not be contiguous, and the mapping of addresses to the specific type of memory regions can be defined at the individual address granularity. It should also be noted that multiple memory regions can be mapped within the address space of a memory module, and that a memory region can also straddle across the address space of multiple memory modules.

Memory controller 130 can be configured to manage memory accesses, including read operations and write operations, and serves as an interface between host processor 110 and volatile memory 140. Memory accesses can be triggered based on requests from host processor 110 or other components of computing system 100 not specifically shown. Memory controller 130 can control the rate of data transfer between volatile memory 140 and host processor 110. For example, memory controller 130 can implement a read buffer and/or a write buffer such the rate at which data is read from or written to volatile memory 140 differs from the rate at which memory controller 130 receives data from or sends data to host processor 110.

In some instances, memory controller 130 can be a direct memory access (DMA) controller. With DMA, a requester initiates a data transfer and receives an interrupt or other acknowledgement once the data transfer is complete. The requester can perform other operations while the data transfer is underway. Memory controller 130 can also be configured to perform operations to optimize utilization of volatile memory 140, such as transferring data directly from one memory device to another to redistribute the data without passing the data through host processor 110. Furthermore, in some implementations, memory controller 130 may implement virtual addressing, for example, by translating virtual memory addresses to corresponding physical addresses associated with volatile memory 140.

In some implementations, memory controller 130 may include a reliability control circuit 120 to perform memory reliability functions such as error decoding in connection with accessing volatile memory 140. For instance, reliability control circuit 120 may include hardware and/or software for implementing an ECC encoder and a corresponding ECC decoder. Reliability control circuit 120 may use the ECC encoder to encode data being written to volatile memory 140. When encoded data is read from volatile memory 140, reliability control circuit 120 may use the ECC decoder to decode the encoded data, detect errors, and attempt error correction. In some implementations, encoded data is stored in volatile memory 140 as Bose-Chaudhuri-Hocquenghem (BCH) codes or Reed-Solomon codes (Reed-Solomon code being a specific type of BCH code). However, reliability control circuit 120 may be configured to generate other types of ECCs such as low-density parity check (LDPC), turbo codes, polar codes, or other suitable coding scheme that provides error correction capability, and/or other reliability information such as checksums, parity values, etc. It should be noted that some or all of the functionality of reliability control circuit 120 can alternatively be implemented in host processor 110, in a component on each memory module 150-1 to 150-4, or be distributed amongst the different components.

Figure 2:
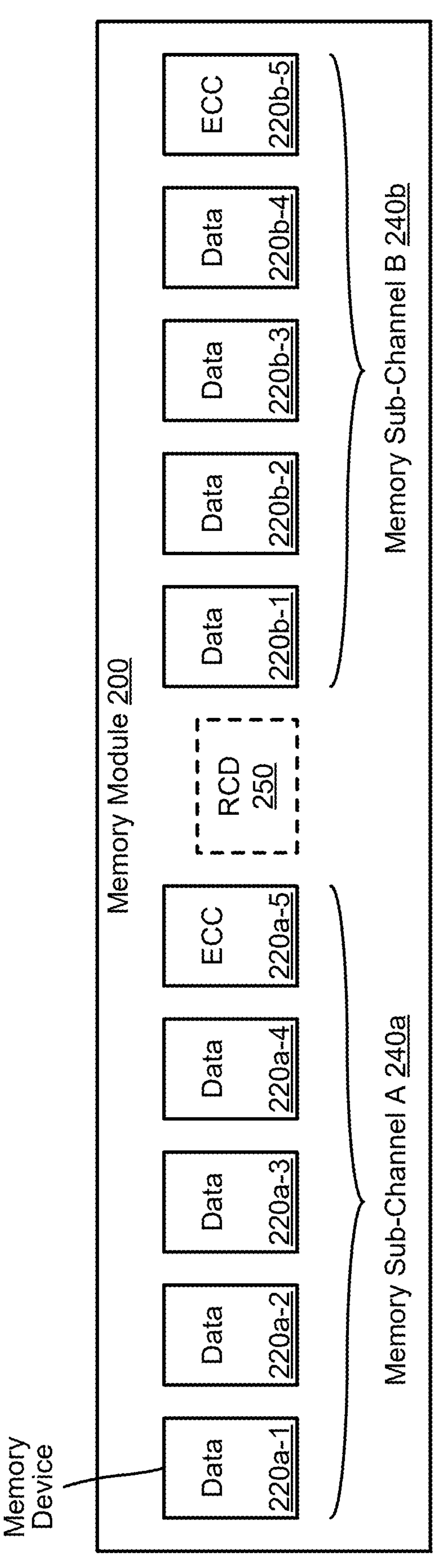
FIG. 2 illustrates a simplified block diagram of an example of a memory module.

FIG. 2 illustrates an example of a memory arrangement in a memory module 200. Memory module 200 can be an example of any of the memory modules 150-1 to 150-4 shown in FIG. 1. Memory module 200 can be coupled to a memory controller via a memory bus (not shown). The memory bus can be configured to convey data between the memory controller and memory module 200. The memory bus or a separate communication bus (not shown) may carry commands (e.g., read or write commands) generated by the memory controller. Such commands may cause data to be read onto the memory bus from memory module 200 or cause data on the memory bus to be written into memory module 200. For instance, a read command may indicate an address in an address space associated with memory module 200. In some instances, the memory controller or some of the functionalities of memory controller (e.g., reliability functions such as ECC encoding/decoding) can be implemented on memory module 200.

Memory module 200 can be a DIMM, a SIMM, or other module containing memory devices mounted on a circuit board. In some implementations, memory module 200 can be a high-bandwidth memory (HBM). As shown in FIG. 2, memory module 200 can include multiple memory devices mounted on a substrate. Each memory device can be a DRAM memory chip or die, which can be any variant of doubled data rate (DDR) synchronous DRAM (e.g., DDR5, DDR6, etc.), low power DDR (LPDDR) SDRAM (e.g., LPDDR5, LPDDR6), or the like. Each memory device may include a certain number of memory banks, and may provide a certain number of data bits that can be accessed together such as 4 bits, 8 bits, or 16 bits. A memory device can be referred to as a x4, x8, or x16 device to represent the number of data bits provided by the memory device.

In some implementations, memory module 200 may provide multiple memory sub-channels that can be accessed independently from other memory sub-channels on the memory module. For instance, a double data rate 5 (DDR5) synchronous DRAM (SDRAM) memory module may provide two memory sub-channels that can be addressed and accessed independently. Each memory sub-channel may have its own address and command bus. Referring to FIG. 2, a first group of memory devices 220*a*-1 to 200*a*-5 can form a memory sub-channel A 240*a*, and a second group of memory devices 220*b*-1 to 200*b*-5 can form a memory sub-channel B 240*b*. In some implementations, each of the memory devices (e.g., DDR5 memory devices) on memory module 200 may include on-die ECC to correct internal bit errors of the memory device. In addition to the on-die ECC, memory module 200 may support on-module ECC by allocating a memory device within each memory sub-channel for storing ECC information for the data of the memory sub-channel.

By way of example, each memory device in memory module 200 can be a x8 device. Each memory sub-channel may include a group of memory devices designated for storing data, and one memory device designated for storing error correction code information for the data stored in the group of memory devices. Hence, in memory sub-channel A 240*a*, memory devices 220*a*-1 to 200*a*-4 may provide 32 bits of data at a given address, and memory device 220*a*-5 may provide 8 bits of ECC information for each 32 bits of data. Similarly, in memory sub-channel B 240*b*, memory devices 220*b*-1 to 200*b*-4 may provide 32 bits of data at a given address, and memory device 220*b*-5 may provide 8 bits of ECC information for each 32 bits of data. Such an ECC coding scheme can be referred to as having a coding rate of 0.8. The coding rate can be defined as the ratio of the number of data bits to the total number of bits in the codeword including the number of data bits and the number of reliability or redundancy information bits (e.g., ECC bits). In this example, the coding rate can be computed as 32/40=0.8. Generally, a lower coding rate provides a higher level of protection because more of the codeword is allocated to redundancy or reliability information.

It should be noted that in other implementations, memory module 200 can include a different number of memory devices. For example, to support a similar data bus width, a memory module can be implemented using ten x4 memory devices for each memory sub-channel. As another example, for a memory module that does not support on-module ECC, the memory module can be implemented using four x8 memory devices or eight x4 memory devices per memory sub-channel. As a further example, a memory module can implement an enhanced on-module ECC protection by adding one or more additional memory devices allocated for storing ECC information. Hence, a memory module may include, for instance, six x8 memory devices per sub-channel in which four memory devices are dedicated for data storage and two memory devices are allocated for storing ECC information.

In some implementations, memory module 200 may include other components in addition to the memory devices. For example, memory module 200 may include a register clock driver (RCD) 250 that is used to buffer and re-time signals between a memory controller and the memory devices. The RCD can adjust the skews of the different signal lines, for example, to account for the different locations of the memory devices. As mentioned above, some or all of the functionality of reliability control circuit 120 can be implemented on a memory module. For example, reliability control circuit 120 (or certain functionalities of reliability control circuit 120) can be implemented as part of RCD 250, or in a separate component on memory module 200. In some implementations, memory module 200 may include other components not specifically shown such as power management circuitry, temperature sensors, etc. It should be noted that certain features of memory module 200 such as on-die ECC, on-module ECC, RCD 250, etc., can be optional and may not be needed to implement certain aspects of the present disclosure.

Figure 3:
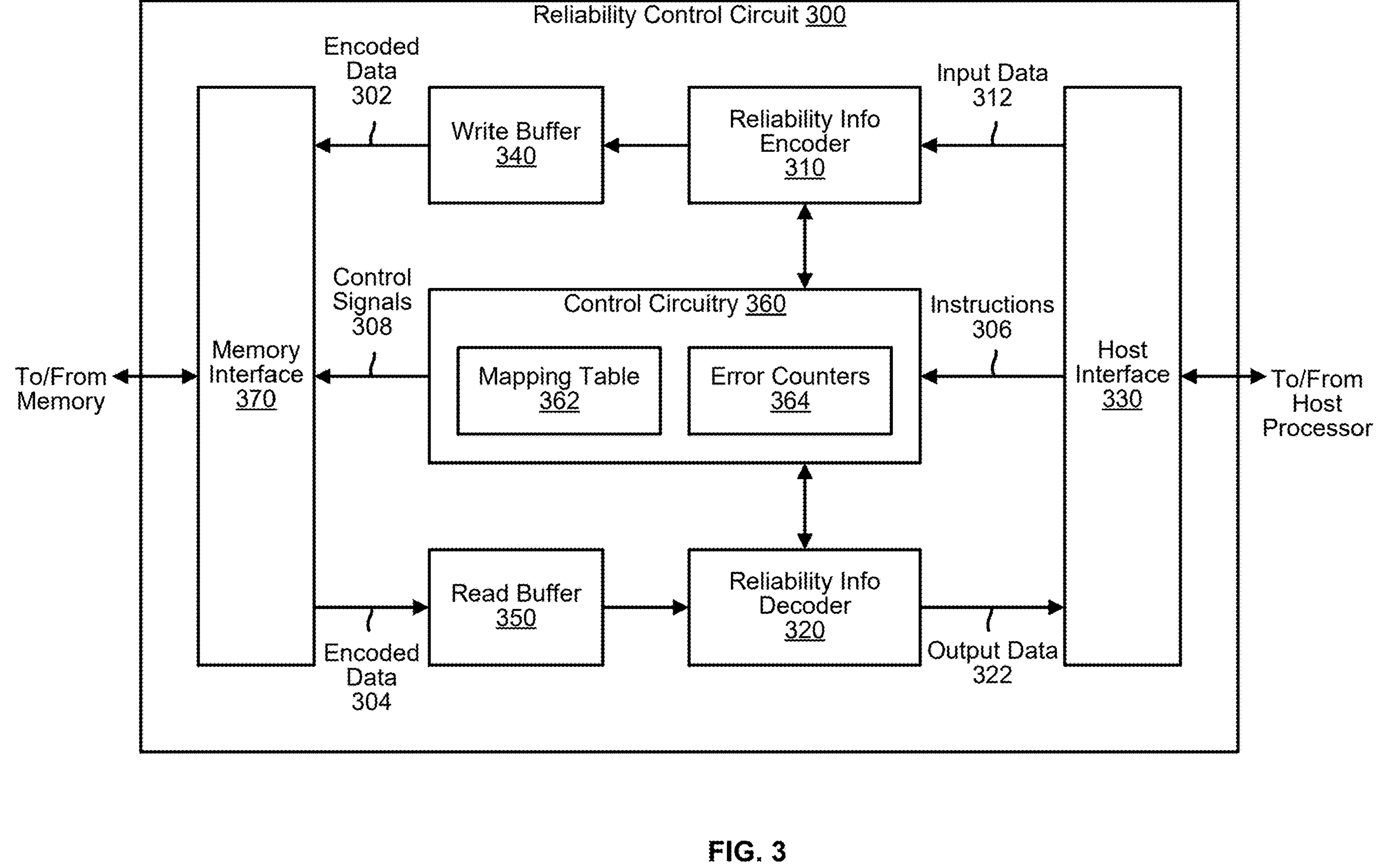
FIG. 3 illustrates a simplified block diagram of an example of a reliability control circuit.

FIG. 3 illustrates a simplified block diagram of a reliability control circuit 300. Reliability control circuit 300 can be an example of reliability control circuit 120. In some implementations, some of the components shown in FIG. 3 can be omitted from reliability control circuit 300. Additionally or alternatively, reliability control circuit 300 may include other components not specifically shown. Some or all of the components and/or functionalities of reliability control circuit 300 can also be implemented elsewhere such as on a memory module, or on a host processor. Reliability control circuit 300 may include a reliability information encoder 310, reliability information decoder 320, a host interface 330, a write buffer 340, a read buffer 350, control circuitry 360, and a memory interface 370.

Host interface 330 can be used to communicate with a host processor or other components that can issue access requests to the volatile memory of a computing system. For instance, the host interface 330 can be connected to a communication bus that is coupled to a host processor (e.g., host processor 110). Data communicated between the reliability control circuit 300 and a host processor via host interface 330 can include input data 312 supplied by the host processor for writing into volatile memory and/or output data 322 requested to be read out of volatile memory by the host processor.

Reliability information encoder 310 can be implemented using software, hardware, or a combination of software and hardware. Reliability information encoder 310 can be configured to generate reliability information such as ECCs by encoding the input data 312 received via the host interface 330. In some implementations, reliability information encoder 310 may include circuitry (e.g., an application-specific integrated circuit (ASIC) or a field-programmable gate array (FPGA)) configured to execute an ECC encoding algorithm such as a Reed-Solomon encoding algorithm. The ECC encoding algorithm executed by reliability information encoder 310 can output ECCs with the input data as encoded data 302. In other implementations, the ECC encoding algorithm can be implemented in program code, with the program code being executable by a processing unit local to the reliability information encoder 310 or by control circuitry 360.

Reliability information encoder 310 may also support multiple ECC algorithms to implement ECCs of different schemes (e.g., different polynomials) and/or coding rates depending on the size of the codeword and the available space allocated for ECC information in the memory. For example, different memory regions may employ different ECC schemes for different levels of protection. In some implementations, selection of which ECC algorithm to use can be perform dynamically to change the ECC scheme deployed in a memory region of the volatile memory. For example, when a memory device failure is detected, the ECC scheme can be adjusted to perform erasure encoding to recover data attributed to the failed device. As another example, if a memory channel has failed due to too many memory device failures in the memory channel, the remaining working memory devices in the memory channel can be reallocated to store reliability information for another working memory channel. In such a scenario, the ECC algorithm for the working memory channel can be adjusted to reduce the coding rate by taking advantage of the additional space available for redundancy information provided by the failed channel. This can increase the protection for the working memory channel by having a higher error correction capability (correct a higher number of erroneous bits).

Reliability information encoder 310 may also compute other reliability information such as parity values and checksums. In some implementations, the reliability information can be computed not only over the input data 312 from the host interface, but also data stored in the volatile memory (e.g., for cross-channel parity protection). In such protection schemes, control circuitry 360 can orchestrate the read accesses to read the data from volatile memory, and provide the read data to reliability information encoder 310 as inputs to compute the reliability information (e.g., parity values).

Write buffer 340 can be configured to temporarily store the encoded data 302 for transmission to the volatile memory. For example, write buffer 340 may store the encoded data 302 in a queue, and dequeue the encoded data 302 based on a rate at which the volatile memory can consume such data. In some implementations, a separate write buffer (not depicted) may be coupled to the input side of the reliability information encoder 310 to provide buffering for the input data 312.

Control circuitry 360 can be configured to issue read commands and/or write commands to volatile memory based on an instruction 306 received from a host processor. For example, instructions 306 can be a macro instructions that can be executed using atomic memory operations, for example, a sequence of read and/or write operations to specific addresses within an address space associated with the volatile memory. Upon receipt of such a macro instruction, control circuitry 360 may decode the macro instruction to generate commands for implementing the atomic memory accesses. Commands to memory can be issued in the form of control signals 308, which can be communicated to the volatile memory via memory interface 370. The volatile memory, in conjunction with the control signals 308, may receive encoded data 302 for writing into a memory location indicated by the control signals 308 or supply encoded data 304 from a memory location indicated by the control signals 308.

Control circuitry 360 can maintain a mapping table 362 that maps address ranges to different memory regions. For example, mapping table 362 may include a mapping of address ranges to normal memory region(s) and enhanced reliability memory region(s). Furthermore, for the enhanced reliability memory regions, mapping table 362 may also include a mapping of address ranges to the enhanced protection scheme used in the corresponding address range. Different address ranges within an enhanced reliability memory region can use different enhanced protection schemes. For example, a certain address range can use sub-channel mirroring while another address range can use cross-channel parity protection. The mapping information in mapping table 362 can be dynamically adjusted to change which address is mapped to which region, and/or to change which enhanced protection scheme is used at which address. For example, the address mapping can be updated in response to detecting a memory device, sub-channel, and/or channel failure to change the protection scheme used for the working memory.

When writing data to a particular address, control circuitry 360 can determine which protection scheme (including which ECC algorithm) to use to protect the data based on the address mapping in mapping table 362, and instruct reliability information encoder 310 accordingly. If the protection scheme uses additional data stored in the volatile memory (e.g., cross-channel parity protection), control circuitry 360 can read the needed data from the volatile memory and provide the data to reliability information encoder 310. Similarly, when reading data from a particular address, control circuitry 360 can determine which protection scheme (including which ECC algorithm) to use to detect and recover errors based on the address mapping in mapping table 362, and instruct reliability information decoder 320 accordingly. If the decoding or data recovery requires additional data stored in the volatile memory, control circuitry 360 can read the needed data from the volatile memory and provide the data to reliability information decoder 320.

Control circuitry 360 can also maintain a set of error counters 364. The error counters 364 can count correctable errors and uncorrectable errors for each memory device, for each memory sub-channel, or for each memory channel. The error information can be reported by reliability information decoder 320 when reading data from the volatile memory. Error thresholds can be set at the memory device, sub-channel, and/or channel levels to determine whether a memory device, sub-channel, and/or channel is failing. In some implementations, the error thresholds can be based on the uncorrectable errors. In some implementations, the error thresholds can be based on a combination of correctable errors and uncorrectable errors. For example, a memory device can be considered failing if the uncorrectable error count for the memory device exceeds a first error threshold, or if the correctable error count for the memory device exceeds a second error threshold that is higher than the first error threshold.

Reliability information decoder 320 can be implemented in software, hardware, or a combination of software and hardware. Reliability information decoder 320 can be configured to decode the encoded data 304 supplied from the volatile memory. The decoding of the encoded data 304 produces output data 322 for output to a host processor via the host interface 330. As with the reliability information encoder 310, in some implementations, the reliability information decoder 320 may include circuitry configured to execute an ECC decoding algorithm such as a Reed-Solomon decoding algorithm. For instance, as discussed above, decoding of Reed-Solomon codes can involve error decoding and can be performed using one or more algorithms configured to detect error locations, calculate error magnitudes, and/or correct errors. In other implementations, an ECC decoding algorithm may be implemented in program code, with the program code being executable by a processing unit local to the reliability information decoder 320 or by control circuitry 360. For example, error location detection, error value calculation, and error correction can be implemented as software routines executed by a processor in reliability information decoder 320.

Similar to reliability information encoder 310, reliability information decoder 320 can support multiple ECC algorithms and/or multiple protections schemes, which can be selected based on the address mapping in mapping table 362. Reliability information decoder 320 may determine if there are any bit errors in the encoded data 304. If there are bit errors, reliability information decoder 320 can correct the error if the error is correctable and provide the corrected data to host interface 330. For both correctable and uncorrectable errors, the location of the error is provided to control circuitry 360 to update the corresponding error counters.

Read buffer 350 can be configured to temporarily store the encoded data 304 supplied from the physical memory for decoding by the reliability information decoder 320. For example, the read buffer 350 may store the encoded data 304 in a queue and dequeue the encoded data 304 based on a rate at which the reliability information decoder 320 can consume such data. In some implementations, a separate read buffer may be provided on the output side of the reliability information decoder 320 to provide buffering for the output data 322.

Memory interface 370 can be used to communicate with the volatile memory of a computing system. For instance, the memory interface 370 may include signal pins or ports connected to a memory bus that is coupled to a memory module and/or memory devices. Data communicated between the reliability control circuit 300 and volatile memory via memory interface 370 can include encoded data 302 supplied by the reliability information encoder 310 for writing into volatile memory and/or encoded data 304 requested to be read out of the volatile memory. Controls signals 308 (e.g., command and address signals) can also be provided to the volatile memory via memory interface 370.

FIG. 4 illustrates an example of a data structure 400 for storing a data chunk in volatile memory. In the example shown, five memory devices (Device-0 to Device-4) form a memory sub-channel 440. Each of the memory devices can be a memory chip or a memory die. Memory sub-channel 440 can be one of multiple memory sub-channels provided in a memory module that can each be accessed independently from the other memory sub-channels. Each memory device can be a x8 device, meaning that each memory device contributes 8 bits of data per read/write cycle. The data chunk shown in FIG. 4 includes 512 bits or 64 bytes of data, and may correspond to the size of a cache line 482 for a host processor of the computing system. The data chunk also includes 128 bits of ECC information to protect the 512 bits of data. The data chunk can be written to or read from memory sub-channel 440 using a burst of 16 beats. Each beat in the burst access can transfer 32 bits of data to Device-0 to Device-3, and 8 bits of ECC information to Device-4 at a given address. The 16-beat burst can correspond to a full burst access supported by the memory module.

Organizing the data chunk for storage across the five memory devices (Device-0 to Device-4) with 32 bits of data and 8 bits of ECC information can provide a x4 chipkill protection. This means that if up to 4 bits of adjacent data that feed into different parity bits of the ECC word are faulty, memory sub-channel 440 can continue to operate by recovering the data stored in the faulty bits using the ECC information. However, such chipkill protection does not protect against failure of an entire x8 memory device, in which case 8 faulty bits are present.

FIG. 5 illustrates an example of a data structure 500 for storing a data chunk in volatile memory using sub-channel interleaving. In the example shown, the memory module includes two memory sub-channels. Five x8 memory devices (Device-0 to Device-4) can form a first memory sub-channel 540*a*, and five x8 memory devices (Device-5 to Device-9) can form a second memory sub-channel 540*b*. The data chunk shown in FIG. 5 includes 512 bits or 64 bytes of data, and may correspond to the size of a cache line for a host processor of the computing system. The data chunk also includes 128 bits of ECC information to protect the 512 bits of data.

Instead of storing the entire data chunk in one memory sub-channel, the data chunk can be split into two portions in which half of the data chunk is stored in memory sub-channel A 540*a* and the other half of the data chunk is stored in memory sub-channel B 540*b*. Hence, 256 data bits of the data chunk can be stored across Device-0 to Device-3 with 64 bits of ECC information stored in Device-4 over eight address locations in memory sub-channel A 540*a*, and 256 data bits of the data chunk can be stored across Device-5 to Device-8 with 64 bits of ECC information stored in Device-9 over eight address locations in memory sub-channel B 540*b*. Each portion of the data chunk can be written using a write burst chop access, which provides half the burst length of a regular burst access. Hence, each write burst chop access has 8 beats, with each beat transferring 32 bits of data and 8 bits of ECC information to a given address. The data chunk can be read in a similar manner using a pair of read burst chop accesses to the two memory sub-cannels 540*a* and 540*b*.

Spreading the data chunk across the two memory sub-channels has the advantage of providing a x8 chipkill protection. By way of example, the 512 bits data chunk can be protected using two codewords, with each codeword being 256 bits of data with 64 bits of ECC. Four codewords that each includes 128 bits of data and 32 bits of ECC information can also be used. Accessing the data chunk with burst chop accesses to two memory sub-channels can reduce the memory bandwidth as compared to a full burst access to one sub-channel. Nevertheless, the sub-channel interleaving can be used to achieve a higher level of reliability to protect against a x8 memory device failure.

In some implementations, not all memory regions of the volatile memory may require the enhanced reliability protection at the cost of lower bandwidth. As such, for less sensitive data that may not require x8 chipkill protection, the data chunk can be written into one memory sub-channel. Whereas for data that may require enhanced protection, the data chunk can be split and interleaved amongst multiple memory sub-channels. A reliability control circuit (e.g., reliability control circuit 300) can intercept accesses to the volatile memory and determine if the access is directed to a normal memory region or to an enhanced reliability memory region (e.g. by comparing the address to mapping table 362). If the access is directed to an enhanced reliability memory region, the reliability control circuit can generate two burst chop accesses respectively to the two memory sub-channels to interleave the data chunk amongst the memory sub-channels.

Each memory sub-channel can be accessed using its own address and command bus, and the two portions of data chunk can be written at the same address in the memory sub-channels, respectively. Within each memory sub-channel, only half of the space of a full data chunk is used. As such, the address being supplied to each memory sub-channel can be adjusted from the address of the original access request, for example, by dividing the address of the original request by two, or by right shifting the address by one bit.

It should also be noted that the sub-channel interleaving technique can be applied to memory modules having more than two memory sub-channels, and/or to memory sub-channels of other architectures. For example, a similar sub-channel interleaving can be applied to memory sub-channels that are each formed with eight x4 memory devices for data storage and two x4 memory devices for storing ECC information, or with two x16 memory devices for data storage and one x16 memory device for storing ECC information (although half of the x16 ECC memory device can be unused). For memory modules that support N>2 number of memory sub-channels, the sub-channel interleaving technique can split the data chunk into N portions that are each stored in one of the N number of memory sub-channels on the memory module.

In some implementations, the reliability of the volatile memory can be increased by increasing the number of redundancy bits. For example, instead of using one x8 memory device to store 8 bits of ECC information for a 32-bit wide data bus spanning four x8 memory device in a memory sub-channel, two x8 memory devices can be used to store 16 bits of ECC information for the 32-bit wide data bus. Under this example, the coding rate can be lowered from 0.8 to 32/48=0.67 to correct full x8 device failure. In other implementations, such a coding rate can be achieved in a memory sub-channel by using eight x4 memory devices for data storage and four x4 memory devices for storing ECC information, or two x16 memory devices for data storage and one x16 memory devices for storing ECC information.

More generally, increasing the number of memory devices or the number of bits allocated for redundancy or reliability information can improve reliability and increase the error correction capability. The reliability information can be ECC or other low-rate codes (e.g., LDPC) that provide a coding rate lower than 0.8. The reliability information can be stored in specific memory devices or be spread amongst the memory devices in a memory sub-channel. In some implementations, the reliability information can be a repetition code (with a coding rate of 0.5) to provide mirroring within a memory sub-channel. In some implementations, the mirroring can be applied across sub-channels as discussed below.

FIG. 6 illustrates a conceptual diagram 600 of applying sub-channel mirroring to enhance the reliability of the volatile memory. As shown in FIG. 6, a memory channel 610 may include a first memory sub-channel A 640*a* and a second memory sub-channel B 640*b*. One of the memory sub-channels (e.g., memory sub-channel B 640*b*) can be allocated as a redundant sub-channel. When writing data to memory sub-channel A 640*a*, a duplicate copy of the data is written to the same address location in memory sub-channel B 640*b*. For example, when writing the data a0 to address 0 of memory sub-channel A 640*a*, a duplicate copy of the data a0 is written to address 0 of memory sub-channel B 640*b*. Similarly, when writing the data a1 to address 1 of memory sub-channel A 640*a*, a duplicate copy of the data a1 is written to address 1 of memory sub-channel B 640*b*, and so on.

When reading data from memory channel 610, a read access can be performed at the read address in both memory sub-channel A 640*a* and memory sub-channel B 640*b*. In some implementations, the decoding of the read data from the two memory sub-channels using the ECC information can be performed in parallel. The first correctly decoded results (e.g., data with no error or with correctable error) can be returned to the requester. In some implementations, the decoded results from the two memory sub-channels can be compared with each other, and the decoded data can be returned to the requester if the results from both memory sub-channels match and validate each other. A data mismatch between the two memory sub-channels can indicate mis-corrections or silent data corruptions, which ECC alone does not detect.

Alternatively, a read access can be performed at the read address in one of the memory sub-channels. The memory sub-channel being read can be fixed (e.g., memory sub-channel A 640*a*), randomly selected, or alternating between the two memory sub-channels. In some implementations, the random selection or alternation can be applied after each read, after a certain duration of time, or after a certain number of reads. If the read data is correctly decoded, the data can be returned to the requester. If an uncorrectable error is encountered, then a read access can be performed at the read address in the other memory sub-channel, and the decoded data from the other memory sub-channel is provided to the requester.

The additional reliability gained by sub-channel mirroring comes at the cost of half the memory capacity. As such, the sub-channel mirroring can be applied to certain enhanced reliability memory regions, while other normal memory regions can retain full use of both sub-channels. For example, a reliability control circuit can determine if a write access is directed to an enhanced reliability memory region based on the address mapping. If the write access is directed to an enhanced reliability memory region, the reliability control circuit can perform two write accesses to the same address in both memory sub-channels. If the write access is directed to a normal memory region, the reliability control circuit can perform one write access. A similar determination can be made for a read access as to whether the access is directed to an enhanced reliability memory region or to a normal memory region.

When an uncorrectable error is encountered in one of the memory sub-channels, the data stored at the other memory sub-channel can be used to recover the erroneous data, and the correct data from the other sub-channel can be re-written back to the faulty memory sub-channel. Comparison with the data stored at the other memory sub-channel can also be used to detect mis-corrections and silent data corruptions. An error counter for each memory device on the memory sub-channel can be maintained to assess the health of the memory devices. In some implementations, if a memory device has reached a certain level of uncorrectable errors, the memory device can be deemed defective (e.g., chipkill scenario). The memory sub-channel can switch to erasure decoding to supply the correct data from the defective memory device. Using the same amount of reliability information bits as compared to ECC for correcting errors at random locations, erasure decoding can recover a greater number of missing bits by knowing the locations of the missing bits. The memory channel can continue applying the sub-channel mirroring.

In some implementations, the memory device may support post-package repair. Post-package repair can be used to replaced defective rows inside the memory device with spare rows. Post-package repair can be performed if errors are persistent on certain rows of a memory device. During the row replacement process, memory accesses can be directed to the other memory sub-channel. Upon completion of the row replacement, a resynchronization process can be performed to synchronize the data between the two sub-channels before the memory sub-channel having the row replacement is put back into service.

However, if more than one memory device on the memory sub-channel is found to be detective, and the failure is beyond the error correction capability of the ECC scheme, any remaining memory device in the faulty sub-channel that is still working can be repurposed. For example, the remaining working memory devices in the faulty sub-channel can be repurposed to store enhanced reliability information for the working memory sub-channel by extending the number of bits allocated for ECC. This allows the working memory sub-channel to switch to a higher level ECC protection scheme with a lower coding rate.

By way of example, referring to FIG. 6, if three memory devices in memory sub-channel A 604*a* are found to be defective, the remaining memory devices in memory sub-channel A 604*a* can be repurposed from storing data to storing enhanced ECC information. For instance, if each memory sub-channel is implemented using five x8 memory devices and originally supports 32 bits of data and 8 bits of ECC information, then the three remaining working x8 memory devices in memory sub-channel A 604*a* can be repurposed to support a stronger ECC encoding with a coding rate of 0.5 that provides a total of 32 bits of ECC information for 32 bits of data.

FIG. 7 illustrates a conceptual diagram 700 of applying cross-channel parity protection to enhance the reliability of the volatile memory. In the example shown, the volatile memory may include a set of four memory channels (Ch. 0 710, Ch. 1 711, Ch. 2 712, and Ch. 3 713). At a given address, a subset of memory channels are used for data storage (referred to as data memory channels), and at least one memory channel is used to store reliability information (referred to as a reliability memory channel). The reliability information stored in the reliability memory channel can be, for example, a bitwise XOR of the data stored in the data memory channels. The reliability memory channel can also be used to store other high-level code designed to provide redundancy for the protected memory channels.

By way of example, referring to address 0, memory channels 710, 711, and 712 can be used for data storage, and memory channel 713 can be used for storing reliability information at address 0. If the data stored in memory channel 710 at address 0 is a0, the data stored in memory channel 711 at address 0 is b0, and the data stored in memory channel 712 at address 0 is c0, then the reliability information can be computed as the bitwise XOR of a0, b0, and c0. The reliability information can be stored at address 0 in memory channel 713. It should be noted that in the context of cross-channel parity protection, the data stored in the data memory channels can itself include ECC information. For example, the data stored at address 0 in each of data memory channels 710 to 712 may include 32 bits of data and 8 bits of ECC information. The reliability information store in the reliability memory channel 713 can be a 40 bit value that includes the bitwise XOR results of the 32 data bits and the 8 ECC bits from the three data memory channels 710 to 712. This provides an additional layer of protection across memory channels on top of the ECC protection provided in each data memory channel. In some implementations, the data stored in each data memory channel can omit the ECC information, for example, if on-module is not supported by the memory channel.

When writing new data to a data memory channel, the reliability information can be updated to reflect the new data being written. One way to compute the updated reliability information is to read the data at the corresponding address from the other data memory channels, and recompute the XOR of the new data and the respective data from the other data memory channels. However, if the number of data memory channels covered by the reliability information is large, this can cause a significant increase in the latency to update the reliability information due to the large number of data memory channels that need to be read.

Instead of reading from all the data memory channels that are not being written, the updated reliability information can be computed by reading the prior data stored at the target address in the data memory channel being written, reading the prior reliability information stored at the target address in the reliability memory channel, and computing the updated reliability information as an XOR of the prior data stored in the data memory channel, the new data being written, and the prior reliability information stored in the reliability memory channel. Computing the updated reliability information in such manner can avoid having to read from each of the other data memory channels.

To reduce wear and hot spots on the reliability memory channel, different addresses can use a different memory channel as the reliability memory channel. For example, referring to FIG. 7, address 0 may use memory channel 713 as the reliability memory channel, and address 1 may use memory channel 710 as the reliability memory channel. In some implementations, the selection of the which memory channel to use as the reliability memory channel can be determined based on a modulo of the given address and a number of memory channels in the set of memory channels. Using the modulo to determine the reliability memory channel can implement a round robin selection to spread the reliability information across the available memory channels. In other implementations, the reliability memory channel can be selected, for example, randomly, and the selection of the reliability memory channel can be indicated in a mapping table.

When reading from a data memory channel, if the data being read contains an uncorrectable error that cannot be corrected by the on-module ECC of the memory channel, then the reliability information from the reliability memory channel and the data at the corresponding address from the other data memory channels can be retrieved to reconstruct the data being read. The recovered data can be written back to the data memory channel being read. In some implementations, if the number of errors on a memory device exceeds an error threshold, the memory device can be determined as defective, and the memory channel containing the memory device can switch to erasure decoding to continue operating. However, if additional memory devices become defective or the number of bit errors exceeds the capability of the erasure decoding, an entire memory channel can be deemed defective. In such a scenario, reliability memory channel can be repurposed from storing reliability information to being used for storing actual data.

By way of example, referring to FIG. 7, if memory channel 710 is determined to be defective, the memory channel that was previously used as the reliability memory channel at each address can be repurposed to store the recovered data for the defective memory channel. For instance, at address 0, memory channel 713 was used as the reliability memory channel. Upon failure of memory channel 710, the reliability information stored at address 0 in memory channel 713 can be read along with the data stored at address 0 from the working data memory channels 711 and 712. The data stored at address 0 in memory channel 710 can be recovered and be written back to address 0 in working memory channel 713.

At address 1, because the memory channel that was used to store reliability information (memory channel 710) is the defective memory channel, no additional writeback is performed. The working memory channels 711 to 713 can continue to operate as data memory channels for data storage. A similar process can be performed at each address to repurpose the reliability memory channel. The change in usage of a memory channel can be reflected in a mapping table to indicate that the cross-channel parity protection is no longer available at the affected address locations.

As with the sub-channel mirroring technique described above, allocating an entire memory channel for reliability information may reduce the capacity of the volatile memory in the computing system. To lessen the impact on capacity, the cross-channel parity protection can be applied to address ranges that are mapped to enhanced reliability memory regions. For other address ranges that are mapped to normal memory regions, all memory channels can be used as data memory channels for data storage. In some implementations, the address mapping can be dynamically modified to vary the amount of memory allocated to the different types of memory regions.

It should also be understood that the cross-channel parity protection can be extended to volatile memory implemented with a different number of memory channels. For example, in a memory system having eight memory channels, seven memory channels can be allocated for data storage and one memory channel can be allocated for storing reliability information. Alternatively, the eight memory channels can be split into two groups of four memory channels. With each group, three memory channels can be allocated for data storage and one memory channel can be allocated for storing reliability information.

Although different techniques (e.g., sub-channel interleaving, sub-channel mirroring, and cross-channel parity protection) for enhancing the reliability of volatile memory have been separately described, the different techniques can be combined together in some implementations. Furthermore, it should be understood that the techniques described herein can be used in combination with on-module ECC and/or on-die ECC to provide multilevel redundancy protection.

FIG. 8 illustrates a flow diagram of an example of a process 800 for enhancing the reliability of volatile memory. The volatile memory can be implemented using one or more memory modules (e.g., DIMM). Each memory module may correspond to a memory channel, or multiple memory modules can be combined to form a memory channel. Each memory module may include multiple memory sub-channels that can be accessed independently from the other memory sub-channel(s). For example, each memory sub-channel may have its own command and address bus on the memory module. Each memory sub-channel may include a number of memory devices (e.g., DDR5 or other types of memory), and each of the memory devices can be implemented using a memory chip or memory die.

In some implementations, process 800 can be performed by an integrated circuit such as a reliability control circuit. The reliability control circuit can be part of a memory controller, or part of a component on a memory module that integrates certain functionalities of a memory controller. The reliability control circuit can be part of a computing system that includes a host processor and volatile memory being accessed by the reliability control circuit. In some implementations, process 800 or a portion of process 800 can be performed by an upstream device such as a host processor or DMA engine that integrates certain functionalities of a memory controller. In some implementations, the steps of process 800 can be performed by various components of an integrated circuit device such as a system-on-chip (SoC) device.

Process 800 may begin at block 802 by receiving a write request (e.g., from a host processor or other requester component such as a DMA engine) to store a data chunk in volatile memory having a memory module that contains a plurality of memory sub-channels. The write request can be in the form of one or more write commands, a machine or processor instruction, or certain logic states of one or more control signals. In some implementations, the data chunk can correspond to the size of a cache line of a host processor of a computing system.

At block 804, in response to the write request, a first write access can be performed to write at least a first portion of the data chunk into a first memory sub-channel of the memory module. At block 806, also in response to the write request, a second write access can be performed to write at least a second portion of the data chunk into a second memory sub-channel of the memory module.

In some implementations, process 800 can be used to implement sub-channel interleaving to improve chipkill protection. To spread the code word over more memory devices, the first write access at block 804 can write a first half of the data chunk (e.g., a cache line) at an address in the first memory sub-channel, and the second write access at block 806 can write a second half of the data chunk (e.g., a cache line) at the same address in the second memory sub-channel as the first write access. The first write access and the second write access can each be performed as a burst chop access.

In some implementations, each of the memory sub-channels can be implemented using a first plurality of memory devices to store data, and a second plurality of memory devices to store error correction code information computed over the data stored in the first plurality of memory devices. The error correction code information stored in the second plurality of memory devices may provide a coding rate below 0.8, in which the coding rate is a ratio of the number of data bits to the number of bits in the codeword (which is a sum of the number of data bits and the number of reliability information bits). The error correction code information can be generated, for example, by a reliability information encoder of a reliability control circuit or other integrated circuit device. In some implementations, the reliability information can be implemented using Reed-Solomon, Bose-Chaudhuri-Hocquenghem (BCH), low density parity check (LDPC), turbo codes, polar codes, or other suitable coding scheme that provides error correction capability.

When a read request is received (e.g., from a host processor or other requester component) to read the data chunk (e.g., cache line) from a target address in the volatile memory, two accesses can be performed in response to the read request. A first read burst chop access can be performed to read the first half of the data chunk from the first memory sub-channel of the memory module corresponding to the target address of the read request. A second read burst chop access can be performed to read the second half of the data chunk from the second memory sub-channel of the memory module corresponding to the target address of the read request.

In some implementations, an error count can be maintained for each of the memory devices in each of the memory sub-channels of the memory module. A memory device can be determined as defective based on the error count of the memory device exceeding an error threshold (e.g., chipkill scenario). The system can continue using the memory sub-channel containing the defective memory device by recovering data stored on the defective memory device based on the error correction code information of the memory sub-channel containing the defective memory device.

In some implementations, the sub-channel interleaving can be applied selectively to certain memory regions but not to other memory regions. For example, the volatile memory can include a normal memory region mapped to a first address range and an enhanced reliability memory region mapped to a second address range. The first write access and the second write access for the sub-channel mirroring can be performed in response to determining that the write request of block 802 is for the enhanced reliability memory region mapped to the second address range.

When a second write request is received to write a second data chunk to the volatile memory, and the second write request is writing to the normal memory region mapped to the first address range, then the second data chunk can be written to the volatile memory as a normal write operation without interleaving the data to a second memory sub-channel. In other words, the data chunk can be written contiguously into one memory sub-channel instead of spreading the data across two memory sub-channels.

In some implementations, process 800 can be used to implement sub-channel mirroring to provide a redundant memory sub-channel for data stored in the memory module. For sub-channel mirroring, the first write access at block 804 can write the data chunk at an address in the first memory sub-channel, and the second write access on block 806 can write a duplicate copy of the data chunk (repetition code) at the same address in the second memory sub-channel as the first write access.

When a read request is received to read the data chunk from the volatile memory, a first read access can be performed to read the data chunk from the first memory sub-channel. If it is determined that the read access has an error, a second read access can be performed to read the duplicate copy of the data chunk in the second memory sub-channel to recover the correct data. The mirrored memory sub-channel can be used to recover uncorrectable errors that cannot be decoded using the available ECC information, as well as detect and recover silent data corruptions that may manifest as mis-corrections.

In some implementations, the particular memory device in the first memory sub-channel that caused the error can be identified (e.g. by performing a bitwise comparison of the data from the first read against the data from the second read), and an error count for the identified memory device can be incremented. When the error count of the memory device reaches or exceeds a configurable error threshold, the memory device can be determined as being defective. In such a scenario, the working memory devices in the memory sub-channel containing the defective memory device can be repurposed from being used for storing data to being used for storing enhanced error correction code information for data stored in the other memory sub-channel. In other words, the working memory devices from the memory sub-channel containing the defective memory device can provide addition ECC bits to improve the error correction capabilities to protect the working memory sub-channel.

In some implementations, given that the sub-channel mirroring reduces the usable memory capacity of the volatile memory, the sub-channel mirroring can be applied selectively to certain memory regions but not to other memory regions. For example, the volatile memory can include a normal memory region mapped to a first address range and an enhanced reliability memory region mapped to a second address range. The first write access and the second write access for the sub-channel mirroring can be performed in response to determining that the write request of block 802 is for the enhanced reliability memory region mapped to the second address range.

When a second write request is received to write a second data chunk to the volatile memory, and the second write request is writing to the normal memory region mapped to the first address range, then the second data chunk can be written to the volatile memory as a normal write operation without a duplicate copy of the second data chunk. In other words, the sub-channel mirroring is not performed for the second write request targeting the normal memory region. This can preserve the memory capacity for data that may not need the higher reliability.

FIG. 9 illustrates a flow diagram of another example of a process 900 for enhancing the reliability of volatile memory. The volatile memory can be implemented using one or more memory modules (e.g., DIMM). Each memory module may correspond to a memory channel, or multiple memory modules can be combined to form a memory channel. Each memory channel may include a number of memory devices (e.g., DDR5 or other types of memory), and each of the memory devices can be implemented using a memory chip or memory die.

In some implementations, process 900 can be performed by an integrated circuit such as a reliability control circuit. The reliability control circuit can be part of a memory controller, or part of a component on a memory module that integrates certain functionalities of a memory controller. The reliability control circuit can be part of a computing system that includes a host processor and volatile memory being accessed by the reliability control circuit. In some implementations, process 900 or a portion of process 900 can be performed by an upstream device such as a host processor or DMA engine that integrates certain functionalities of a memory controller. In some implementations, the steps of process 900 can be performed by various components of an integrated circuit device such as a system-on-chip (SoC) device.

Process 900 can be performed to apply cross-channel parity protection in a volatile memory. Process 900 may begin at block 902 by receiving a write request (e.g., from a host processor or other requester component such as a DMA engine) to write new data at a target address in a selected data memory channel of a volatile memory implemented using a set of memory channels. The write request can be in the form of one or more write commands, a machine or processor instruction, or certain logic states of one or more control signals.

For a given address of the memory channels, the set of memory channels includes a subset of data memory channels that are used for data storage, and a reliability memory channel that is used for storing reliability information for the data stored in the subset of data memory channels. In some implementations, different addresses may use a different memory channel from the set of memory channels as the reliability memory channel. For example, which memory channel in the set of memory channels is used as the reliability memory channel for a given address can be determined based on a modulo of the given address and a number of memory channels in the set of memory channels.

At block 904, reliability information can be computed over the new data being written to the selected data memory channel, and data stored in the other data memory channels in the subset of data memory channels at the target address. For example, the reliability information can be a bitwise XOR of the new data being written, and the data stored in the other data memory channels in the subset of data memory channels at the target address. In some implementation, the reliability information can be computed by reading the prior data stored in the selected data memory channel at the target address, reading prior reliability information stored in the reliability memory channel at the target address, and computing the reliability information as an XOR of the prior data, the new data, and the prior reliability information.

At block 906, the new data can be written to the selected data memory channel at the target address. At block 908, the computed reliability information can be written to the reliability memory channel at the target address. When a read request is received to read data stored at a read address of a data memory channel, the data being read may contain an uncorrectable error that cannot be corrected using the available ECC information from the read data. Nevertheless, the read data can be recovered based on reliability information stored in the reliability memory channel at the read address, and data stored in other data memory channels in the subset of data memory channels at the read address. The recovered read data can be rewritten back to the read address of the data memory channel being read.

In some implementations, an error count can be maintained for each of the memory channels. A memory channel can be determined to be defective when the error count of the memory channel exceeds a configurable error threshold. For each address of the defective memory channel that is storing data, the data of the defective memory channel can be recovered based on reliability information stored in the reliability memory channel at the corresponding address, and data stored in other data memory channels at the corresponding address. The reliability memory channel at the corresponding address can be repurposed to be a data memory channel by writing the recovered data to the reliability memory channel.

In some implementations, given that the cross-channel parity protection reduces the usable memory capacity of the volatile memory, the cross-channel parity protection can be applied selectively to certain memory regions but not to other memory regions. For example, the volatile memory can include a normal memory region mapped to a first address range that uses every memory channel in the set of memory channels for data storage, and an enhanced reliability memory region mapped to a second address range that uses one of the memory channels as the reliability memory channel. The first address range and the second address range can be dynamically configurable.

Figure 10:
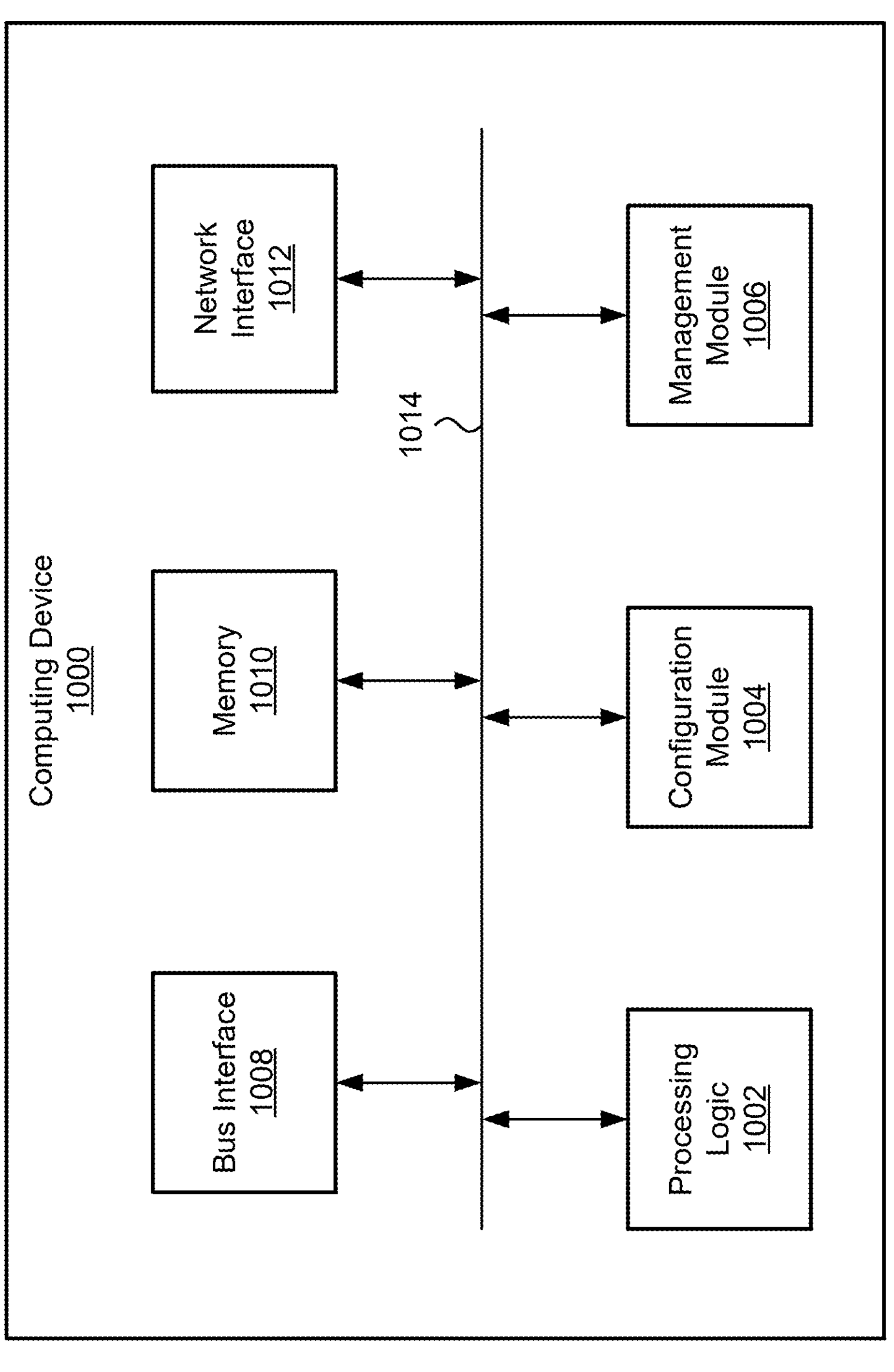
FIG. 10 illustrates a simplified block diagram of another example of a computing system.

FIG. 10 illustrates an example of a computing device 1000 that may utilize the memory reliability techniques disclosed herein. In one example, the computing device 1000 may include processing logic 1002, a configuration module 1004, a management module 1006, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The computing device 1000 may include additional modules, not illustrated here. In some implementations, the computing device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel©, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the computing device 1000, while in other cases some or all of the memory may be external to the computing device 1000. The memory 1010 may store an operating system comprising executable instructions that, when executed by the processing logic 1002, provides the execution environment for executing instructions providing networking functionality for the computing device 1000. The memory may also store and maintain several data structures and routing tables for facilitating the functionality of the computing device 1000.

In some implementations, the configuration module 1004 may include one or more configuration registers. Configuration registers may control the operations of the computing device 1000. In some implementations, one or more bits in the configuration register can represent certain capabilities of the computing device 1000. Configuration registers may be programmed by instructions executing in the processing logic 1002, and/or by an external entity, such as a host device, an operating system executing on a host device, and/or a remote device. The configuration module 1004 may further include hardware and/or software that control the operations of the computing device 1000.

In some implementations, the management module 1006 may be configured to manage different components of the computing device 1000. In some cases, the management module 1006 may configure one or more bits in one or more configuration registers at power up, to enable or disable certain capabilities of the computing device 1000. In certain implementations, the management module 1006 may use processing resources from the processing logic 1002. In other implementations, the management module 1006 may have processing logic similar to the processing logic 1002, but segmented away or implemented on a different power plane than the processing logic 1002.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the computing device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1000 may include multiple network interface modules, each configured to communicate with a different network. For example, in these implementations, the computing device 1000 may include a network interface module for communicating with a wired Ethernet network, a wireless 802.11 network, a cellular network, an Infiniband network, etc.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner described and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:

a host processor;

a reliability control circuit; and a volatile memory implemented using a plurality of memory modules, each of the memory modules having a plurality of memory sub-channels, wherein each memory sub-channel includes a plurality of memory designated for storing data and at least one memory die designated for storing error correction code information for the data stored in the plurality of memory dies, wherein the reliability control circuit is operable to:

receive a write request from the host processor to store a cache line at a target address in the volatile memory; and in response to the write request, perform a first write burst chop access to write a first half of the cache line into a first set of memory dies of a first memory sub-channel of a memory module; and perform a second write burst chop access to write a second half of the cache line into a second set of memory dies of a second memory sub-channel of the memory module.

2. The computing system of claim 1, wherein the first half of the cache line is written at an address in the first memory sub-channel, and the second half of the cache line is written at that same address in the second memory sub-channel.

3. The computing system of claim 1, wherein the reliability control circuit is further operable to:

receive a read request from the host processor to read the cache line from the target address in the volatile memory; and in response to the read request:

perform a first read burst chop access to read the first half of the cache line from the first memory sub-channel of a memory module corresponding to the target address of the read request; and perform a second read burst chop access to read the second half of the cache line from the second memory sub-channel of the memory module corresponding to the target address of the read request.

4. The computing system of claim 3, wherein the reliability control circuit is further operable to:

continue using a memory sub-channel containing a defective memory device by recovering data stored on the defective memory device based on the error correction code information of the memory sub-channel containing the defective memory device.

5. The computing system of claim 1, wherein the volatile memory includes a normal memory region and an enhanced reliability memory region that provides higher reliability than the normal memory region.

6. The computing system of claim 5, wherein the reliability control circuit is operable to:

handle write requests for the normal memory region by storing data for each write request directed to the normal memory region in one memory sub-channel; and handle write requests for the enhanced reliability memory region by splitting data for each write request directed to the enhanced reliability memory region for storing in multiple memory sub-channels.

7. The computing system of claim 5, wherein the reliability control circuit is operable to determine whether an access is being directed to the normal memory region or to the enhanced reliability memory region by comparing an address of the access against a mapping table.

8. A method comprising:

receiving a write request to store a data chunk in a volatile memory implemented using a memory module that contains a plurality of memory sub-channels;

in response to the write request:

performing a first write access to write at least a first portion of the data chunk into a first memory sub-channel of the memory module; and performing a second write access to write at least a second portion of the data chunk into a second memory sub-channel of the memory module, determining that a memory device in the first memory sub-channel is defective when an error count of the memory device exceeds an error threshold; and repurposing working memory devices in the first memory sub-channel from being used for storing data to being used for storing enhanced error correction code information for data stored in the second memory sub-channel.

9. The method of claim 8, wherein the first write access and the second write access are each performed as a burst chop access.

10. The method of claim 8, wherein the first write access writes the data chunk at an address in the first memory sub-channel, and the second write access writes a duplicate copy of the data chunk at the same address in the second memory sub-channel as the first write access.

11. The method of claim 10, further comprising:

receiving a read request to read the data chunk from the volatile memory;

performing a first read access to the first memory sub-channel to read the data chunk;

determining that the first read access has an error;

performing a second read access to the second memory sub-channel to recover the data chunk by reading the duplicate copy of the data chunk;

identifying which memory device in the first memory sub-channel caused the error; and writing back the recovered data chunk to the first memory sub-channel.

12. The method of claim 8, wherein the volatile memory includes a normal memory region mapped to a first address range and an enhanced reliability memory region mapped to a second address range, and wherein the first write access and the second write access are performed in response to determining that the write request is for the enhanced reliability memory region mapped to the second address range.

13. The method of claim 12, further comprising:

receiving a second write request to write a second data chunk to the volatile memory;

determining that the second write request is writing to the normal memory region mapped to the first address range; and writing the second data chunk to the volatile memory as a normal write operation.

14. The method of claim 12, wherein the first address range mapped to the normal memory region and the second address range mapped to the enhanced reliability memory region are dynamically configurable.

15. An integrated circuit comprising:

a memory interface; and reliability control circuitry operable to:

receive a write request to store a data chunk in a volatile memory implemented using a memory module having a plurality of memory sub-channels;

in response to the write request:

perform a first write access via the memory interface to write at least a first portion of the data chunk into a first memory sub-channel of the memory module; and perform a second write access via the memory interface to write at least a second portion of the data chunk into a second memory sub-channel of the memory module, determine that a memory device in the first memory sub-channel is defective when an error count of the memory device exceeds an error threshold; and repurpose working memory devices in the first memory sub-channel from being used for storing data to being used for storing enhanced error correction code information for data stored in the second memory sub-channel.

16. The integrated circuit of claim 15, wherein the first write access writes the data chunk at an address in the first memory sub-channel, and the second write access writes a duplicate copy of the data chunk at the same address in the second memory sub-channel as the first write access.

17. The integrated circuit of claim 16, wherein the memory module includes a normal memory region that does not maintain duplicate data, and an enhanced memory region that maintains a duplicate copy of data for redundancy.

18. The integrated circuit of claim 15, wherein the reliability control circuitry is further operable to write error correction code information of the data chunk into the first memory sub-channel of the memory module in response to the write request, wherein the error correction code information provides a coding rate below 0.8, the coding rate being a ratio of a number of data bits to a sum of the number of data bits and a number of reliability information bits.

19. The integrated circuit of claim 18, wherein the error correction code information is stored across multiple memory devices of the first memory sub-channel.

* * * * *